US012421096B2

(12) United States Patent
Pasquale

(10) Patent No.: US 12,421,096 B2
(45) Date of Patent: Sep. 23, 2025

(54) SPEAR VALVE FOR EMPTYING AND FILLING A PRESSURISED BEVERAGE KEG

(71) Applicant: DAUNIA PLAST S.P.A., Trinitapoli (IT)

(72) Inventor: Mauro De Pasquale, Trinitapoli (IT)

(73) Assignee: DAUNIA PLAST S.P.A., Trinitapoli (IT)

( * ) Notice: Subject to any disclaimer, the term of this patent is extended or adjusted under 35 U.S.C. 154(b) by 0 days.

(21) Appl. No.: 18/032,152

(22) PCT Filed: Oct. 14, 2021

(86) PCT No.: PCT/IB2021/059465
§ 371 (c)(1),
(2) Date: Apr. 14, 2023

(87) PCT Pub. No.: WO2022/079661
PCT Pub. Date: Apr. 21, 2022

(65) Prior Publication Data
US 2023/0391601 A1 Dec. 7, 2023

(51) Int. Cl.
*B67D 1/08* (2006.01)

(52) U.S. Cl.
CPC .......... *B67D 1/0832* (2013.01); *B67D 1/0848* (2013.01)

(58) Field of Classification Search
CPC ..... B67D 1/0832; B67D 1/035; B67D 1/0848
See application file for complete search history.

(56) References Cited

U.S. PATENT DOCUMENTS 3,065,885 A * 11/1962 Chatten ................ B67D 1/0832 137/212
3,410,458 A * 11/1968 Johnston .............. B67D 1/0832 222/400.7
3,454,199 A * 7/1969 Malick ................. B67D 1/0832 222/400.7
3,464,435 A * 9/1969 Lamb ................... B67D 1/0832 137/320
3,628,701 A * 12/1971 Kissel .................. B67D 1/0832 222/400.7
3,939,860 A * 2/1976 Golding ............... B67D 1/0832 137/212
4,341,240 A * 7/1982 Cerrato ................ B67D 1/0832 222/400.7
(Continued)

FOREIGN PATENT DOCUMENTS

DE 9421587 U1 2/1996
GB 2202216 A * 9/1988 ............... B67B 7/42
(Continued)

*Primary Examiner* — David Colon-Morales
(74) *Attorney, Agent, or Firm* — Reches Patents

(57) ABSTRACT

A valve device (2) is provided for the filling and the emptying of a double-walled container (1) totally made of a plastic material such as PET or similar, wherein said container (1) comprises a first container (10) and a second container (11) made of yieldable plastic material and being inserted inside said first container (10), the valve device (2) comprises a valve body which includes a first tubular member (20) connected to a second tubular member (21), and a third tubular member (22) mounted in an axially movable manner inside said valve body against the action of a spring (23).

14 Claims, 3 Drawing Sheets

(56) References Cited

U.S. PATENT DOCUMENTS

| | | | | | |
|---|---|---|---|---|---|
| 4,350,273 | A * | 9/1982 | Nezworski | B67D 1/0832 | 137/212 |
| 4,351,456 | A * | 9/1982 | Nezworski | B67D 1/0832 | 137/212 |
| 4,411,287 | A * | 10/1983 | Hyde | B67D 1/0838 | 251/149.6 |
| 4,450,853 | A * | 5/1984 | Dessenoix | B67D 1/0832 | 137/212 |
| 4,501,623 | A * | 2/1985 | Till | B67D 1/0832 | 141/89 |
| 4,665,940 | A * | 5/1987 | Jacobson | B67D 1/0832 | 137/212 |
| 4,715,414 | A * | 12/1987 | Harrison | B67D 1/0832 | 137/212 |
| 4,728,010 | A * | 3/1988 | Johnston | B67D 1/0832 | 137/212 |
| 6,308,869 | B1 * | 10/2001 | Simpson | B67D 1/0847 | 222/542 |
| 6,367,667 | B1 * | 4/2002 | Ipsen | B67D 1/0832 | 222/509 |
| 7,546,935 | B2 * | 6/2009 | Wheaton | B67D 1/0832 | 137/212 |
| 8,056,773 | B2 * | 11/2011 | Van der Klaauw | B67D 1/0848 | 137/317 |
| 8,127,958 | B2 * | 3/2012 | Furuichi | B67D 1/0832 | 222/400.7 |
| 8,684,026 | B2 * | 4/2014 | Rundin | B67D 1/0832 | 137/212 |
| 9,045,325 | B2 * | 6/2015 | Apps | B67D 1/0808 | |
| 9,399,569 | B2 * | 7/2016 | Smith | B67D 1/0808 | |
| 9,670,049 | B2 * | 6/2017 | Apps | B67D 1/0801 | |
| 9,988,178 | B2 * | 6/2018 | Apps | B65D 43/0212 | |
| 10,239,743 | B2 * | 3/2019 | Steinmetz | B67D 1/0832 | |
| 10,882,726 | B2 * | 1/2021 | Ye | B67D 1/125 | |
| 11,006,771 | B2 * | 5/2021 | Paauwe | B67D 1/1272 | |
| 11,072,477 | B2 * | 7/2021 | Covi | B67D 1/0462 | |
| 11,161,682 | B2 * | 11/2021 | Rhoades | B67D 1/0831 | |
| 11,192,771 | B2 * | 12/2021 | Wolter | B67D 1/0838 | |
| 11,524,885 | B2 * | 12/2022 | Walton | B67D 1/0832 | |
| 11,548,774 | B2 * | 1/2023 | Covi | B67D 1/0807 | |
| 11,939,201 | B2 * | 3/2024 | Miyatani | B67D 1/0852 | |
| 2010/0102087 | A1 | 4/2010 | Meike et al. | | |
| 2015/0368084 | A1 * | 12/2015 | Apps | B67D 1/0801 | 222/518 |

FOREIGN PATENT DOCUMENTS

| | | | | | |
|---|---|---|---|---|---|
| WO | WO-8801249 | A1 * | 2/1988 | | |
| WO | WO-2006110948 | A1 * | 10/2006 | B67D 1/0832 | |
| WO | WO-2009074164 | A1 * | 6/2009 | B67D 1/0412 | |

* cited by examiner

SPEAR VALVE FOR EMPTYING AND FILLING A PRESSURISED BEVERAGE KEG

The present invention refers to a valve device for pressurized PET containers and, more precisely, to a valve device for the filling and the emptying of pressurized PET containers in food applications such as, for example, carbonated beverage containers, such as beer and the like.

STATE OF THE ART

To date, various technologies are known for the manufacturing of valve devices for the filling or the emptying of pressurised containers, typically for food applications such as carbonated beverages.

For example, European Patent EP2450307B1 describes a plastic drum container for the containing of carbonated or non-carbonated beverages, such as beer or the like, which comprises a neck portion and a body portion all enclosed in a coating. The container comprises a valve assembly associated with the neck portion of the container, and wherein such valve assembly comprises a port which has a head portion having a convex upper surface and at least a lower portion which includes a downwardly extending rod from a lower surface. The rod includes a stop surface protruding radially outwards beyond the head portion. A piston defines an opening. A spring urges the port against a peripheral portion of the opening defined by the piston, and for the sealing the convex top surface of the head portion above the opening.

According to this document, although the problem of overall dimensions and weights associated with metal drums it is solved, there is a disadvantage that is given by the fact that the valve has a complex constructive structure, especially with regards to the overpressure and venting control operation.

Furthermore, from US patent US20130192691 a valve made of recyclable material and applicable to disposable beer kegs (i.e. plastic kegs) is known, which is characterized by being essentially made of a polymeric material in all its components, thus being able to be recycled without having to face the difficult and costly phase of differentiation of materials prior to recycling thereof.

This constructive solution, albeit practical, has the disadvantage of not providing the possibility of operating the keg in a position other than the vertical one upwards, since it is aimed at only disposable applications, and therefore it is not suitable for being applied to non-disposable drums (Kegs) or where washing and/or filling operations of the exhausted Kegs are foreseen.

Furthermore, metal kegs (so-called Kegs) for carbonated drinks such as beer or similar can only be filled with a dedicated filler. In fact, the filling machines for kegs or metal Kegs fill the keg positioned with the head down. Therefore, in order to be able to fill upside down, the valve must be mounted on the Keg before the filling thereof.

On the other hand, in the case of double walled Kegs for beer or similar (i.e., kegs made of a polymeric material which have two containers one inside the other and which the internal container is made of a collapsible material), they are filled open top (without any valve), and the closing valve/cap is applied at the end of the filling operation.

However, this constructive and functional solution has some disadvantages. In fact, the insertion of the valve after the filling of the container, involves a rise in the beverage level in the container, therefore involving a real risk of foam and liquid leaking and the contamination of the production line.

This requires a washing and drying system for the Keg once it is filled.

Further, with these types of double-walled containers there is also the problem that in order to fill the internal container it is necessary to evacuate the air present in the internal container during the filling thereof.

There is therefore a need to provide on the market a valve for double-walled containers which solves all the aforementioned drawbacks.

Therefore, the object of the present invention is to provide a valve device for the filling and the emptying of pressurised PET containers which allows the filling of the container both in the vertical upward condition and in the vertical downward condition, thus being suitable to be implemented also on already existing production lines.

BRIEF DESCRIPTION OF THE INVENTION

The present invention provides a valve device for the filling and the emptying of a double-walled container totally made of a plastic material such as PET or the like, wherein said container comprises a first container made of a substantially rigid plastic material, and a second container contained inside said first container made of yieldable plastic material and having an inner volume, an internal gaseous volume being defined between said first container and said second container, and a communication port of said internal gaseous volume with the outside, said port being formed at a neck part of mutual connection of said first and second container, wherein said neck part comprises an opening for the filling and/or emptying of said container, said valve device being mounted at said neck part of said container, and a locking member of said valve device into said opening, characterized in that said valve device comprises a valve body which includes a first tubular member connected to a second tubular member, the latter connected in a locked manner to said opening of the container by means of said locking member, a third tubular member mounted in an axially movable manner inside said valve body against the action of a spring, said third tubular member being able to slide through a pneumatic sealing member mechanism arranged at one end of said first tubular member, said third tubular member having a free end, the arrangement being such that said free end of said third tubular member abuts under the thrust of said spring onto a port at the central part of said sealing member.

Therefore, the present invention provides a valve device for the filling and the emptying of pressurised PET containers, substantially according to the appended claims.

DETAILED DESCRIPTION OF THE INVENTION

A detailed description will now be provided of a preferred embodiment of the valve device for the filling and the emptying of pressurized PET containers according to the present invention, given by way of non-limiting example, and with reference to the appended figures wherein.

Figure 1:
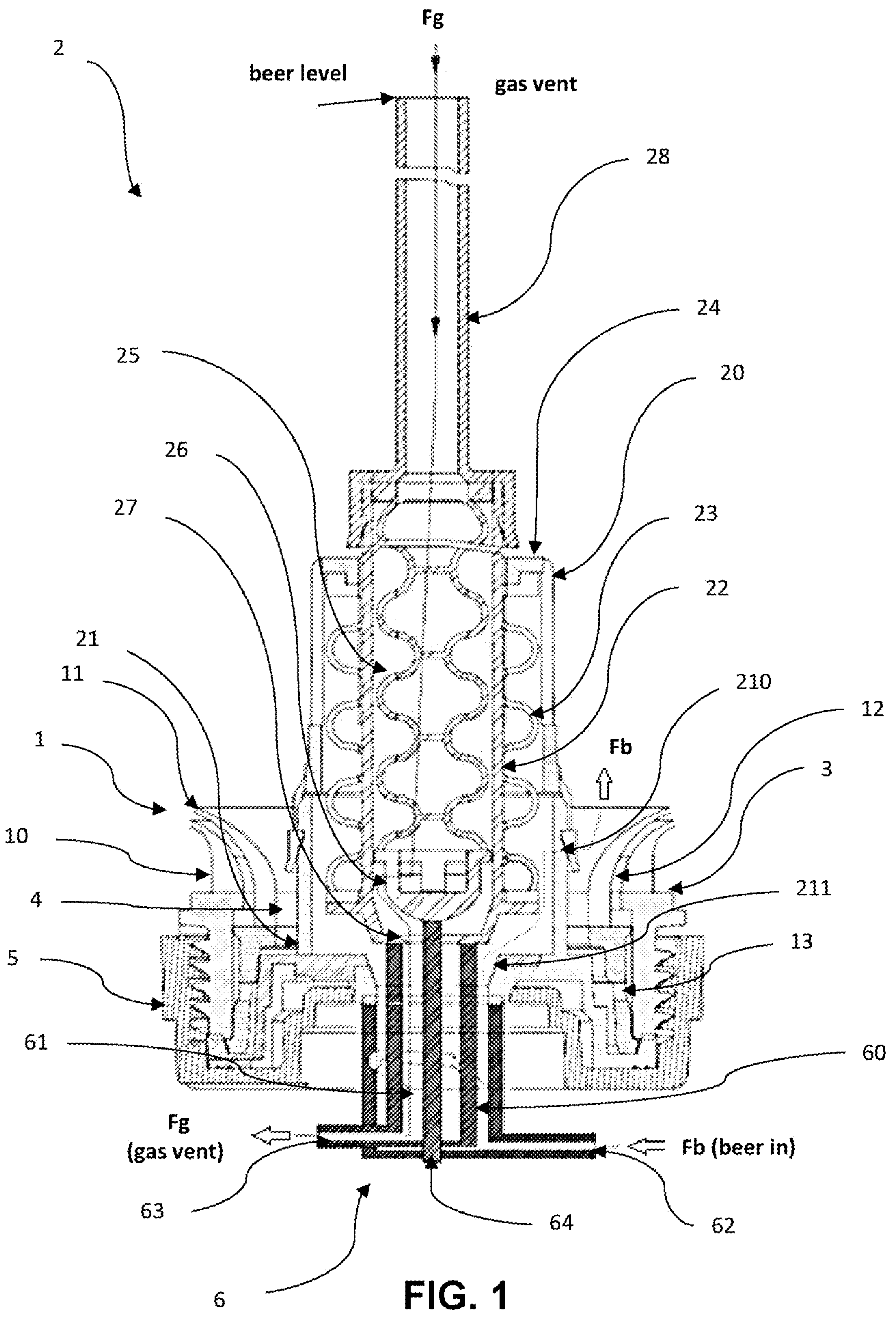
FIG. 1 is a longitudinal section view of a neck part of a double-walled container which mounts the valve device of the present invention in a first operating condition.

With reference now to FIG. 1, the valve device of the present invention is illustrated in a first operating condition, i.e. during the filling of the associated double-walled container with a gaseous drink such as, for example, beer.

As is evident from the figure, this first condition provides for the filling of said container in a vertical "upside down" condition.

It is necessary to point out here that, according to the present invention, it is provided a double-walled container 1 which is totally made of a plastic material such as PET or the like. The container 1 it is obtained after a blowing step from a double walled preform (i.e. a preform consisting of two preforms inserted one inside the other). Once the double preform has been blown, the container 1 it is constituted which comprises a first container 10 and a second container 11 inserted inside the first container 10. The arrangement is such that the first container 10 is made of a substantially rigid plastic material, while the second container 11 is made of yieldable plastic material, and therefore an internal gaseous volume 12 defined between the first container 10 and the second container 11 is obtained and which is variable. At the neck part where is provided the mutual connection of said two containers 10 and 11, a port 13 is provided for communicating the internal volume 12 with the outside and vice versa.

According to the present invention there is provided a valve device 2 typically mounted on a neck part 3 of the container 1 and at an opening 4 for the filling and/or the emptying of the container 1, the whole assembly of the valve device 2 being locked by means of a locking member 5 in an already known manner according to the state of the art.

Typically, the valve device 2 comprises a valve body which includes a first tubular member 20 connected to a second tubular member 21, the latter connected in a locked manner to the opening 4 of the container by means of the locking member 5.

The valve body encloses a third tubular member 22 which is mounted in an axially movable manner inside the valve body against the action of a spring 23 (also made of a polymeric material). The third tubular member 22 is movable and slides through a pneumatic sealing member 24 arranged at the end part of the first tubular member 20, while the free end of the member 22 abuts against a port 211 at the central part of the member 21 closing thereby the port 211 under the bias of said spring 23.

The third tubular member 22 houses a spring 25 which bias a sealing member 26 against a port 27 at the end part of said tubular member 22. A fourth tubular member 28 is connected at the opposite end part of the third tubular member 22, the tubular member 28 has an elongated shape and extends into the internal volume and along the entire length of the container 11 (in the already known manner).

As can be understood from the figure, the fourth tubular member 28 puts the internal volume of the second container 11 in a pneumatic communication with the port 27 of the third tubular member 22 towards the outside.

For the purpose of the operation of the present valve device 2 and for the filling of the container 1 in the upside-down condition, a dedicated connector 6 having a double coaxial "septum" is provided, and which is adapted to interface with the aforementioned valve device 2 in a substantially standardized manner, and wherein in each septum both liquid and, alternatively, gas circulate independently and not communicating one with the other (in the already known manner).

The connector 6 has a first septum 60 and a second septum 61, each of which is connected to a respective supplying port 62 and 63, each of them being connected to a respective liquid and/or gas supplying circuit (better illustrated below).

Furthermore, according to the present invention, an axially movable rod 64 is arranged at the center of the connector 6, the rod 64 being arranged to interface with the sealing member 26, the arrangement being such that the rod 64 can selectively move the sealing member 26 away from the port 27 at the end of the tubular member 22, thereby opening or closing said port 27 to allow the selective passage of both beverage or alternatively gas (better illustrated below).

It should be noted here that according to the present invention, the actuation of the rod 64 allows to control the opening of the member 26 separately from the opening of the member 22, the latter being also movable.

To fill the container 1 from below in the upside-down condition with a liquid or a carbonated/non-carbonated beverage such as beer or the like, the connector 6 interfaces with the valve body 2, putting the septum 60 and 61 in communication with specific areas of the valve device 2. More precisely and according to the figure, the septum 60 is arranged for introducing the beverage inside the container 1 and the connector 6 interfaces the aforementioned septum 60 with a defined volume inside the tubular members 20 and 21 and at the outside of the tubular member 22. The tubular member 21 has a series of ports 210 perimetral arranged at the surface of the tubular member 21 and adapted to put in pneumatic communication the internal volume of the members 20 and 21 and the internal volume to the container 1, the arrangement is such that said carbonated beverage flows in a pneumatic circuit which is defined by the septum 60, the volume inside the valve body, through said ports 211 and 210, up to the inside of the body of the container 1, and as indicated by the arrow Fb in the figure.

On the other hand, during the introduction of the carbonated/non-carbonated beverage into the container 11, the gas inside the internal volume of the container 11 must escape to the outside in order to allow the aforementioned volume to be occupied by the carbonated/non-carbonated beverage. For the above purpose it is provided that the septum 61 is interfaced with the port 27 of the tubular member 22. In this condition, the rod 64 of the connector 6 pushes the sealing member 26 against the action of the spring 25 away from said port 27.

In this manner, a pneumatically isolated circuit is obtained which is defined by the septum 61, the port 27, the internal volume of the tubular member 22 and the internal duct of the elongated tubular member 28, thus putting the internal volume of the container 11 into pneumatic communication with the septum 61. This circuit allows the evacuation of the gas contained inside the container 11 towards the outside through the port 63 of the connector 6, as the volume of carbonated/non-carbonated beverage increases inside the container 11, as illustrated by the arrow Fg in the figure.

Figure 2:
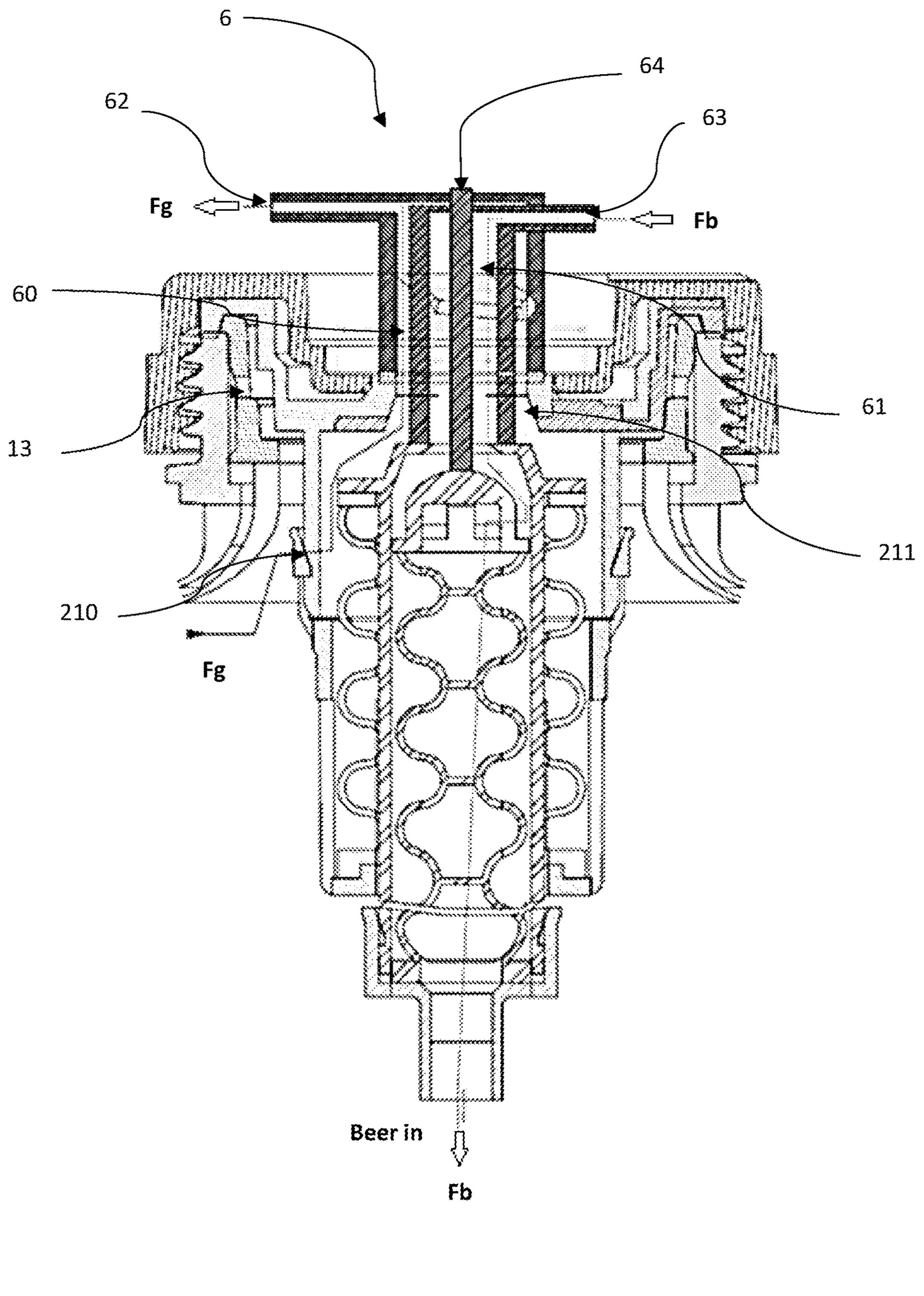
FIG. 2 shows in longitudinal section a neck part of a double-walled container which mounts the valve device of the present invention in a second operating condition.

With reference now to FIG. 2, the valve device of the present invention is illustrated in a second operating condition, wherein the associated container is filled from above in the vertical condition with a carbonated or non-carbonated beverage, such as for example beer.

For the sake of clarity, same parts have same numbers, and the detailed description thereof is here omitted since already given above.

According to this filling condition, the inversion of the flows in septa 60 and 61 is provided and with respect to the preceding condition (i.e., the upside-down filling condition). More precisely, the septum 60 of the connector 6 is arranged to convey the gas from the inside of the container 11 to the outside through the port 62 following the pneumatic circuit diagram previously illustrated, while the septum 61 is arranged to convey the carbonated/non-carbonated beverage inside the container 11 through the port 63 and following the previously illustrated circuit diagram.

Figure 3:
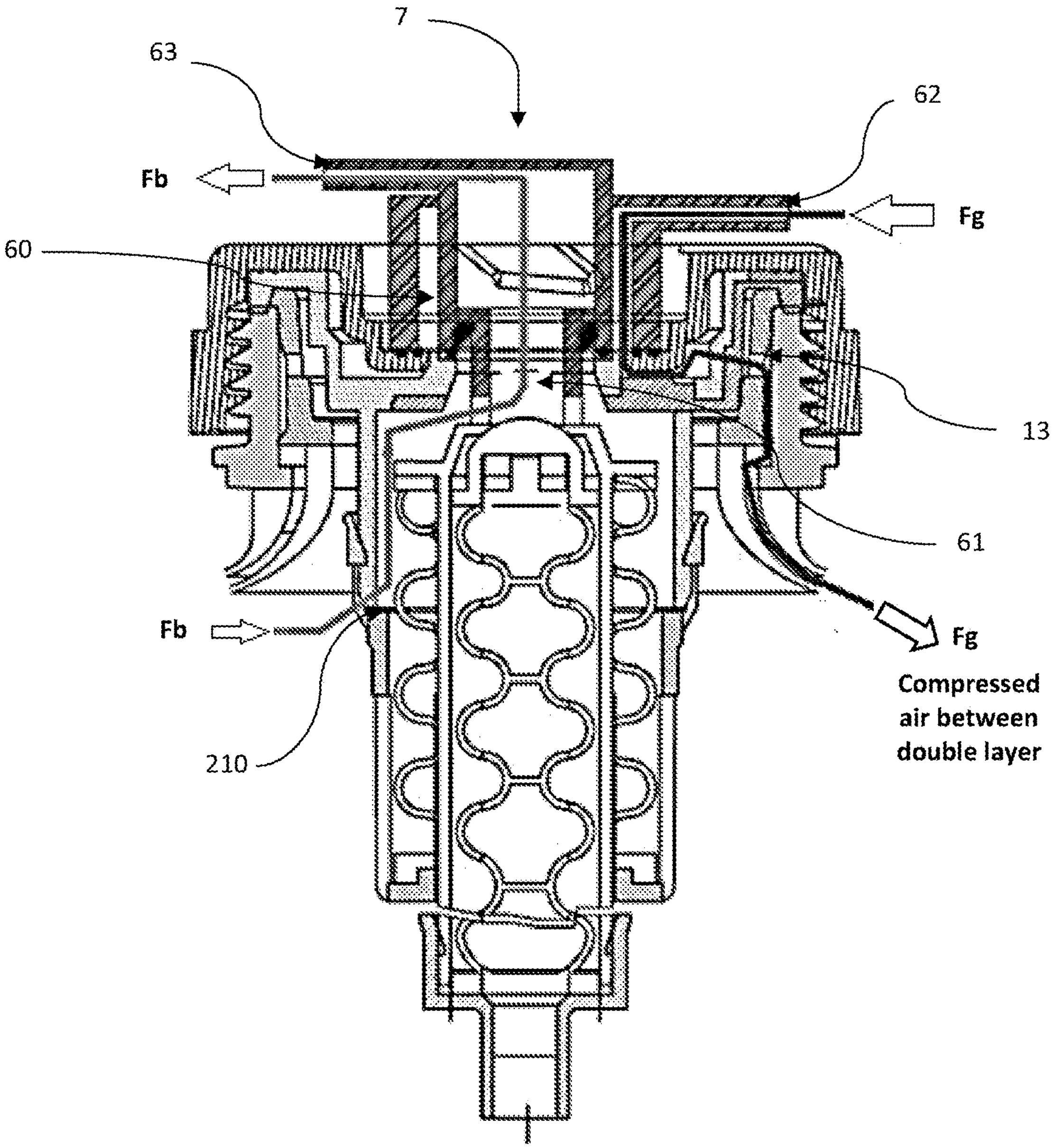
FIG. 3 is a longitudinal section view of a neck part of a double-walled container which mounts the valve device of the present invention in a third operating condition.

With reference now to FIG. 3, the valve device of the present invention it is shown in a third operating condition, that is, during the supply of the carbonated/non-carbonated beverage, such as for example beer.

For the sake of clarity, same parts have same numbers, and the detailed description thereof is here omitted since already given above.

According to this condition for the dispensing of the carbonated/non-carbonated beverage, it is typically provided (although if not bound to) the simultaneous injection of a compressed gas (typically, at a pressure of 1.0-3.0 bar) inside the volume defined between the first container 10 and the second container 11 through the communicating port 13. This allows the beverage to be dispensed at a constant pressure thanks to the progressive deformation of the container 11 as it empties, and without the beverage coming into contact with the injected gas, thus ensuring the best organoleptic qualities of the beverage.

For this purpose, a dedicated connector 7 is provided for feeding the beverage from the container 1 towards the dispensing line. The connector 7 also has a septum 60 which is designed to deliver the compressed gas inside the volume defined between the container 10 and the container 11 through the port 13 according to the circuit diagram defined by the port 62, the septum 60, the port 13 and the internal volume between the container 10 and the container 11, and as indicated by the arrow Fg in the figure.

On the other hand, for dispensing the beverage from the container 11 towards the outside, the injected gas exerts a pressure on the outer wall of the container 11, deforming the latter, and thus forcing the beverage to flow through the pneumatic circuit diagram defined by the opening 210 towards the internal volume of the tubular members 20 and 21, through the septum 61 and flowing from the opening 63 of the connector 7, as illustrated by the arrow Fb.

Advantages

The valve device of the present invention has numerous advantages.

A first advantage is given by the fact that the new valve device 2 allows the filling of the carbonated/non-carbonated beverage in the double-walled container 1 both in the "head up" and in the "upside-down" condition, thus increasing flexibility without having to provide a dedicated line at the beverage production plant.

A second advantage lies in the fact that according to the present new valve device 2 the emptying phase can also be performed in the two different positions of the container 1, i.e. in the "head up" and in the "upside-down" condition.

A third advantage lies in the fact that the present valve device 2 is made entirely of 100% recyclable material, thus reducing operating and production costs.

A fourth advantage lies in the fact that before the filling step of the double-walled PET container, the valve device 2 is already assembled to the container, ensuring the hygiene of the system.

A fifth advantage lies in the fact that the container can be marketed in a conditioned atmosphere.

A sixth advantage resides in the fact that during the filling step of the container 1 a counterpressure can be applied to the gas discharge from inside the container, both in the condition of FIG. 1 and in the condition of FIG. 2. The result advantage consists in a reduction of the foam generated during the filling phase.

The invention claimed is:

1. A valve device for the filling and the emptying of a double-walled container totally made of a PET plastic material, wherein said container comprises a first container made of a substantially rigid plastic material, and a second container inserted inside said first container and made of a yieldable plastic material, thereby defining a gaseous inner volume between said first container and said second container, and a communicating port for communicating said inner volume with the outside, said port being formed at a neck part of a neck and at a mutual connection region of said first and second container, and an opening for the filling/emptying said container is provided at said neck part of the neck, said valve device being mounted onto said neck part of said neck of said container, and a locking member for the locking of said valve device onto said opening, wherein the valve device comprises a valve body which includes a first tubular member connected to a second tubular member, the latter connected in a blocked manner onto said opening of the container through said locking member, a third tubular member mounted in an axially movable manner inside said valve body against the thrust of a spring, said third tubular member being able to slide through a pneumatic sealing member arranged at one end part of said first tubular member, said third tubular member having a free end, the arrangement being such that said free end abuts against the thrust of said spring on a port at the central part of said second tubular member; and wherein said third tubular member internally comprises a spring which urges a sealing member against a port at the end part of said third tubular member, further comprising a connector having a double coaxial septum adapted to interconnect with said valve device during the filling and the emptying of said container, said connector having a first septum and a second septum, each of which is connected to a respective first and second supplying port connected each with a respective liquid and/or gas supply circuit.

2. The valve device for the filling and the emptying of the double-walled container according to claim 1, wherein a fourth tubular member is connected at one end part of said third tubular member, the former extending internally and for the entire length of said second container, the arrangement being such that said fourth tubular member communicates the internal volume of said second container in a pneumatic communication with said port of said third tubular member towards the outside.

3. The valve device for the filling and the emptying of the double-walled container according to claim 1, wherein said second tubular member comprises a series of ports peripheral arranged at the surface of said second tubular member, said series of ports being arranged for pneumatically communicating the internal volume defined by said first and second tubular members and the internal volume of the second container.

4. The valve device for the filling and the emptying of the double-walled container according to claim 1, wherein said connector comprises a movable rod which is mounted in an axially movable manner and is adapted to interface with said sealing member, the arrangement being such that the interconnection of said connector with said valve device causes the axial displacement of said rod, the latter causing said sealing member displacing against the action of said spring and spacing said sealing member from said port at the end of said tubular member, thereby opening said port for the selective flows of both beverage and gas.

5. The valve device for the filling and the emptying of the double-walled container according to claim 4, wherein the actuation of said rod controls the opening of the sealing member separately from the opening of said third tubular member.

6. The valve device for the filling and the emptying of the double-walled container according to claim 5, wherein when filling said container with a beverage in a vertical upside-down condition, said first septum introduces said beverage into said second container through a volume defined between said first and second tubular members and said third tubular member, the arrangement being such that said beverage follows a pneumatic circuit which is defined by the first septum, the volume inside said valve body, through said port at the central part of said second tubular member and said series of ports, up to the inside of said second container, and wherein said second septum is interconnected with said port at the end of said third tubular member, and wherein said rod pushes said sealing member against the action of said spring away from the aforementioned port, defining a gas circuit pneumatically isolated from the beverage circuit and which is defined by the second septum, the said port, the internal volume of the third tubular member and the internal volume of the elongated fourth tubular member, and the internal volume of the second container, and causing the evacuation of gas contained inside the second container towards the outside through said second port of the connector progressively and during the volume increase of said beverage inside said second container.

7. The valve device for the filling and the emptying of the double-walled container according to claim 5, wherein when filling said double walled container with a beverage in a vertical head up condition, said first septum of the connector delivers the gas from the inside of the second container towards the outside through said first port of the connector, and wherein said second septum delivers said beverage inside said second container through said second port of the connector.

8. The valve device for the filling and the emptying of the double-walled container according to claim 4, wherein the actuation of said rod controls the opening of the sealing member separately from the opening of said third tubular member.

9. The valve device for the filling and the emptying of the double-walled container according to claim 4, wherein when filling said container with a beverage in a vertical upside-down condition, said first septum introduces said beverage into said second container through a volume defined between said first and second tubular members and said third tubular member, the arrangement being such that said beverage follows a pneumatic circuit which is defined by the first septum, the volume inside said valve body, through said port at the central part of said second tubular member and said series of ports, up to the inside of said second container, and wherein said second septum is interconnected with said port at the end of said third tubular member, and wherein said rod pushes said sealing member against the action of said spring away from the aforementioned port, defining a gas circuit pneumatically isolated from the beverage circuit and which is defined by the second septum, the said port, the internal volume of the third tubular member and the internal volume of the elongated fourth tubular member, and the internal volume of the second container, and causing the evacuation of gas contained inside the second container towards the outside through second said port of the connector progressively and during the volume increase of said beverage inside said second container.

10. The valve device for the filling and the emptying of the double-walled container according to claim 4, wherein when filling said double-walled container with a beverage in a vertical head up condition, said first septum of the connector delivers the gas from the inside of the second container towards the outside through said first port of the connector, and wherein said second septum delivers said beverage inside said second container through said second port of the connector.

11. The valve device for the filling and the emptying of the double-walled container according to claim 1, wherein when filling said second container with a beverage in a vertical upside-down condition, said first septum introduces said beverage into said second container through a volume defined between said first and second tubular members and said third tubular member, the arrangement being such that said beverage follows a pneumatic circuit which is defined by the first septum, the volume inside said valve body, through said port at the central part of said second tubular member and said series of ports, up to the inside of said second container, and wherein said second septum is interconnected with said port at the end of said third tubular member, and wherein said rod pushes said sealing member against the action of said spring away from the aforementioned port, defining a gas circuit pneumatically isolated from a beverage circuit and which is defined by the second septum, the said port, the internal volume of the third tubular member and the internal volume of the elongated fourth tubular member, and the internal volume of the second container, and causing the evacuation of gas contained inside the second container towards the outside through said second port of the connector progressively and during the volume increase of said beverage inside said second container.

12. The valve device for the filling and the emptying of the double-walled container according to claim 1, wherein when filling said double-walled container with a beverage in a vertical head up condition, said first septum of the connector delivers the gas from the inside of the second container towards the outside through said first port of the connector, and wherein said second septum delivers said beverage inside said second container through said second port of the connector.

13. The valve device for the filling and the emptying of the double-walled container according to claim 1, wherein said second tubular member comprises a series of ports peripheral arranged at the surface of said second tubular member, said ports being arranged for the pneumatically communicating the internal volume defined by said first and second tubular members and the internal volume of the second container.

14. A valve device for the filling and the emptying of a double-walled container totally made of a PET plastic material, wherein said container comprises a first container made of a substantially rigid plastic material, and a second container inserted inside said first container and made of a yieldable plastic material, thereby defining a gaseous inner volume between said first container and said second container, and a communicating port for communicating said inner volume with the outside, said port being formed at a neck part of a neck and at a mutual connection region of said first and second container, and an opening for the filling/emptying said container is provided at said neck part of the neck, said valve device being mounted onto said neck part of said neck of said container, and a locking member for the locking of said valve device onto said opening, wherein the valve device comprises a valve body which includes a first tubular member connected to a second tubular member, the latter connected in a blocked manner onto said opening of the container through said locking member, a third tubular member mounted in an axially movable manner inside said valve body against the thrust of a spring, said third tubular member being able to slide through a pneumatic sealing member arranged at one end part of said first tubular member, said third tubular member having a free end, the arrangement being such that said free end abuts against the thrust of said spring on a port at the central part of said second tubular member, wherein during dispensing of a beverage, a compressed gas is introduced at a pressure between 1.0 and 3.0 bar within the volume defined between the first container and the second container through said communication port, the arrangement being such that said beverage is dispensed under a constant pressure as a result of the progressive deformation of said second container as the volume of beverage decreases.

* * * * *